(No Model.)
W. BUNCH.
CAR COUPLING.
No. 390,156.        Patented Sept. 25, 1888.
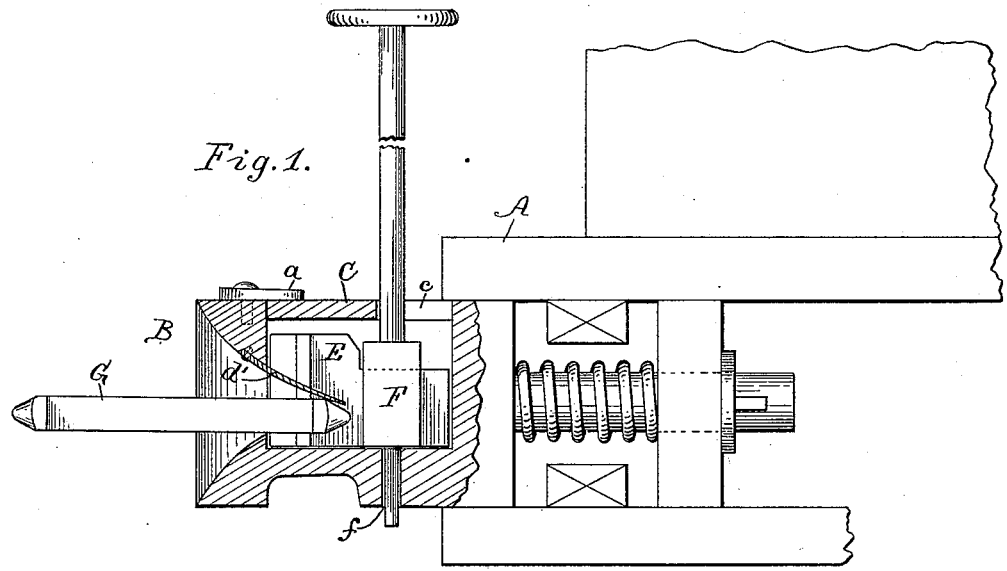
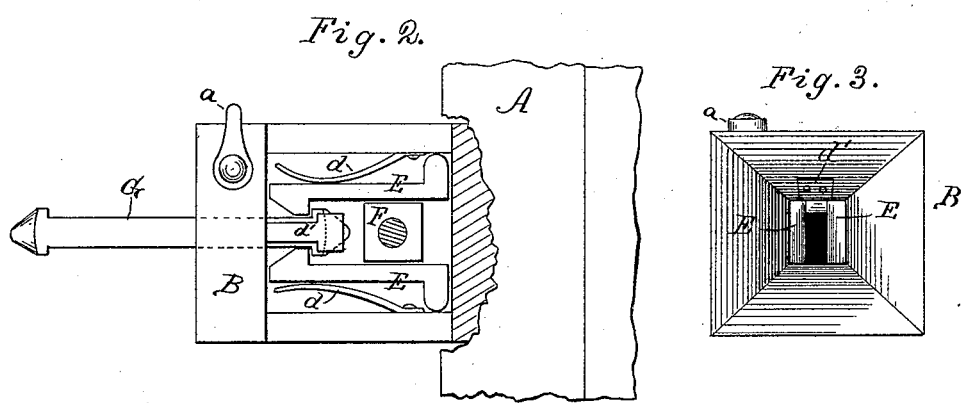
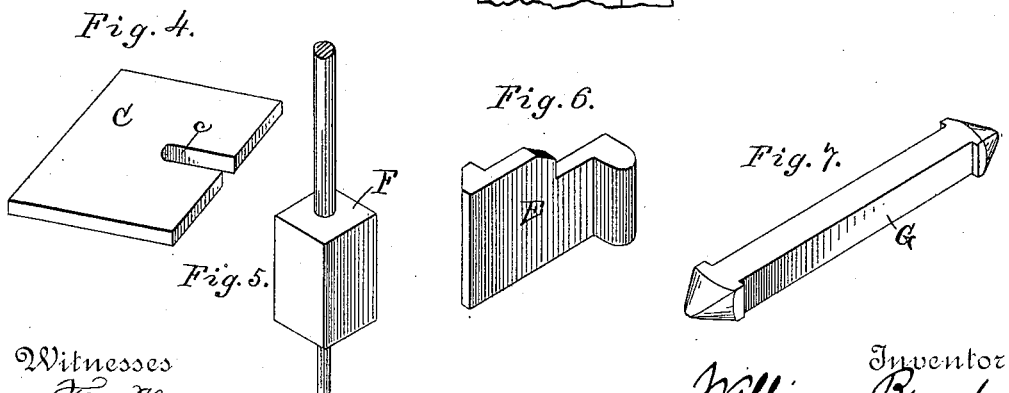
Witnesses
Thos Houghton.
Frank B. Marlow.
Inventor
William Bunch,
By his Attorney
R. McAllister.

United States Patent Office.

WILLIAM BUNCH, OF LUYSTOWN, MISSOURI, ASSIGNOR OF ONE-HALF TO JOHN A. HUESGEN, CHARLES MOORE, AND ULYSSES ZEWICKI, ALL OF SAME PLACE.

CAR-COUPLING.

SPECIFICATION forming part of Letters Patent No. 390,156, dated September 25, 1888.

Application filed October 1, 1887. Serial No. 251,165. (No model.)

*To all whom it may concern:*

Be it known that I, WILLIAM BUNCH, a citizen of the United States, residing at Luystown, in the county of Osage and State of Missouri, have invented certain new and useful Improvements in Couplings for Railway-Cars; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to mechanism for coupling and uncoupling railway-cars; and its object is to enable such coupling or uncoupling to be performed without requiring the operator to place himself between the two cars to be coupled or uncoupled.

In the accompanying drawings, wherein like letters represent like parts, Figure 1 is an interior view of the draw-head of a car furnished with my devices; Fig. 2, a plan view of the interior of the draw-head similarly furnished; Fig. 3, a front perspective of the draw-head, showing the catches for the coupling-pin; Fig. 4, a detached view of the lid or movable top of the draw-head; Fig. 5, a detached view of the lever forming part of the mechanism; Fig. 6, a detached view showing form of the catches used; Fig. 7, a detached view of the coupling-pin.

A is the platform of the car, slightly overhanging the draw-head B, the top of which is made removable to give access to the interior works. The aperture thus provided is closed at will by a lid, C, one end of which fits under the platform, the other end being secured against upward displacement of the interior works by a button, *a*, or other equivalent device, attached to the solid part of the top of the draw-head. Lateral displacement of the lid is guarded against by a recess, *c*, formed in the lid and fitting about the shank of a lever, hereinafter to be described.

The interior of the draw-head is formed into a rectangular chamber, upon the side walls of which are springs *d d*, attached in the manner and bearing in the direction shown in Fig. 2. These springs bear against loose catches E E, of the form shown in Fig. 6. A lever, F, of the form shown in Fig. 5, fits into an orifice, *f*, in the floor of the chamber, its place being between the two catches, as shown in Fig. 2.

A coupling-pin, G, of the form shown in Fig. 7, is provided, and when in place this coupler is borne upon by the spring *d'*, projecting into the chamber to keep said coupler in a horizontal position. The pin being fixed in the draw-head of any car, it will enter an opposing draw-head and effect the desired coupling by an operation apparent from the drawings.

To uncouple a car, it is only necessary to partly revolve the lever F in any direction, so that angles of the squared part of the lever may bear against the catches E E and force them farther apart, so as to release the head of the coupling-pin.

Having thus sufficiently described my invention, what I claim, and desire to secure, is as follows:

In couplings for railway-cars, the combination of the draw-head B, having within the rectangular chamber thereof the catches E E, resting loosely upon the floor of said chamber, the lever F, placed between the said catches and socketed in the floor of said chamber, the springs *d d*, attached to the plane surfaces of the side walls of said rectangular chamber, and the spring *d'*, projecting horizontally into said chamber, with the coupling-pin G, the whole constructed and arranged, as hereinbefore figured and described, for the purpose of coupling and uncoupling railway-cars without placing the operator between the cars to be operated.

In testimony whereof I affix my signature in presence of two witnesses.

WILLIAM BUNCH.

Witnesses:
   WILLIAM C. VAUGHAN,
   L. C. BAILLOT.